United States Patent
Narushima

(10) Patent No.: US 9,204,000 B2
(45) Date of Patent: Dec. 1, 2015

(54) POWER SUPPLY CONTROL DEVICE AND IMAGE PROCESSING APPARATUS

(71) Applicant: FUJI XEROX CO., LTD., Minato-ku, Tokyo (JP)

(72) Inventor: Kazuhiko Narushima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/263,626

(22) Filed: Apr. 28, 2014

(65) Prior Publication Data

US 2015/0146223 A1    May 28, 2015

(30) Foreign Application Priority Data

Nov. 25, 2013   (JP) .................................. 2013-243170

(51) Int. Cl.
  *H04N 1/04*  (2006.01)
  *H04N 1/00*  (2006.01)

(52) U.S. Cl.
  CPC ....... *H04N 1/00901* (2013.01); *H04N 1/00888* (2013.01); *H04N 1/00896* (2013.01); *H04N 2201/0081* (2013.01); *H04N 2201/0093* (2013.01); *H04N 2201/0094* (2013.01)

(58) Field of Classification Search
  CPC .......... H04N 1/00901; H04N 1/00888; H04N 1/00896; H04N 2201/0094; H04N 2201/0081; H04N 2201/0093

USPC ........................................ 358/1.13, 1.9, 1.14
See application file for complete search history.

(56) References Cited

U.S. PATENT DOCUMENTS 8,578,181 B2 * 11/2013 Tanaka .......................... 713/300
2011/0320842 A1  12/2011 Narushima et al.

FOREIGN PATENT DOCUMENTS

JP    2002-044305 A    2/2002
JP    2012-016096 A    1/2012

* cited by examiner

*Primary Examiner* — Houshang Safaipour
(74) *Attorney, Agent, or Firm* — Sughrue Mion, PLLC

(57) ABSTRACT

A power supply control device includes a first power supply unit, a second power supply unit, and a mode controller. The first power supply unit receives electric power supplied from a commercial power source. The second power supply unit receives electric power supplied from an accumulative power source. The mode controller controls a power-supplied object to one of a group of modes, which at least include a first mode in which the electric power is supplied from the first power supply unit and the second power supply unit and a second mode in which the electric power is supplied from the second power supply unit, and sets the power-supplied object in the first mode and subsequently causes the power-supplied object to transition to the second mode.

11 Claims, 9 Drawing Sheets

FIG. 4B

[EXPLANATORY LEGENDS]

| TRANSITION PATTERN | BEFORE TRANSITION → AFTER TRANSITION | TRANSITION CONDITIONS, ETC. |
|---|---|---|
| a | (5) → (6) | · SECOND POWER SWITCH IS MANUALLY TURNED OFF OR START TIMING FOR ZERO-POWER OFF MODE IS REACHED |
| b | (6) → (5) | · SECOND POWER SWITCH IS MANUALLY TURNED ON |
| b' | (6) → (3) | · SECOND POWER SWITCH IS MANUALLY TURNED ON |
| c | (6) → (7) | · START TIMING FOR ZERO-POWER OFF MODE IS REACHED (SUFFICIENT AMOUNT OF CHARGE) |
| d | (7) → (6) | · STOP TIMING FOR ZERO-POWER OFF MODE IS REACHED (TO MODE BEFORE TRANSITION VIA (6)) OR SECOND POWER SWITCH IS MANUALLY TURNED ON |
| e | (5) → (3) | · NO OPERATION FOR SPECIFIC TIME PERIOD |
| f | (3) → (4) | · SUFFICIENT AMOUNT OF CHARGE (LVPS → POWER ACCUMULATING DEVICE) |
| g | (4) → (6) | · SECOND POWER SWITCH IS MANUALLY TURNED OFF OR START TIMING FOR ZERO-POWER OFF MODE IS REACHED |
| h | (3) → (6) | · SECOND POWER SWITCH IS MANUALLY TURNED OFF OR START TIMING FOR ZERO-POWER OFF MODE IS REACHED |
| i | (4) → (5) | · RESTORE COMMAND (POWER-SAVING CONTROL SWITCH OR HUMAN DETECTION SENSOR) |
| j | (3) → (5) | · RESTORE COMMAND (POWER-SAVING CONTROL SWITCH OR HUMAN DETECTION SENSOR) |
| k | (5) → (1) | · SERVICE (SUCH AS COPY) IS SELECTED |
| l | (1) → (2) | · OPERATION START COMMAND |
| m | (2) → (1) | · OPERATION STOP |
| n | (1) → (5) | · NO OPERATION START COMMAND FOR SPECIFIC TIME PERIOD |
| o | (1) → (6) | · SECOND POWER SWITCH IS MANUALLY TURNED OFF OR START TIMING FOR ZERO-POWER OFF MODE IS REACHED |
| p | (1) → (3) | · POWER-SAVING COMMAND (POWER-SAVING CONTROL SWITCH OR HUMAN DETECTION SENSOR) |

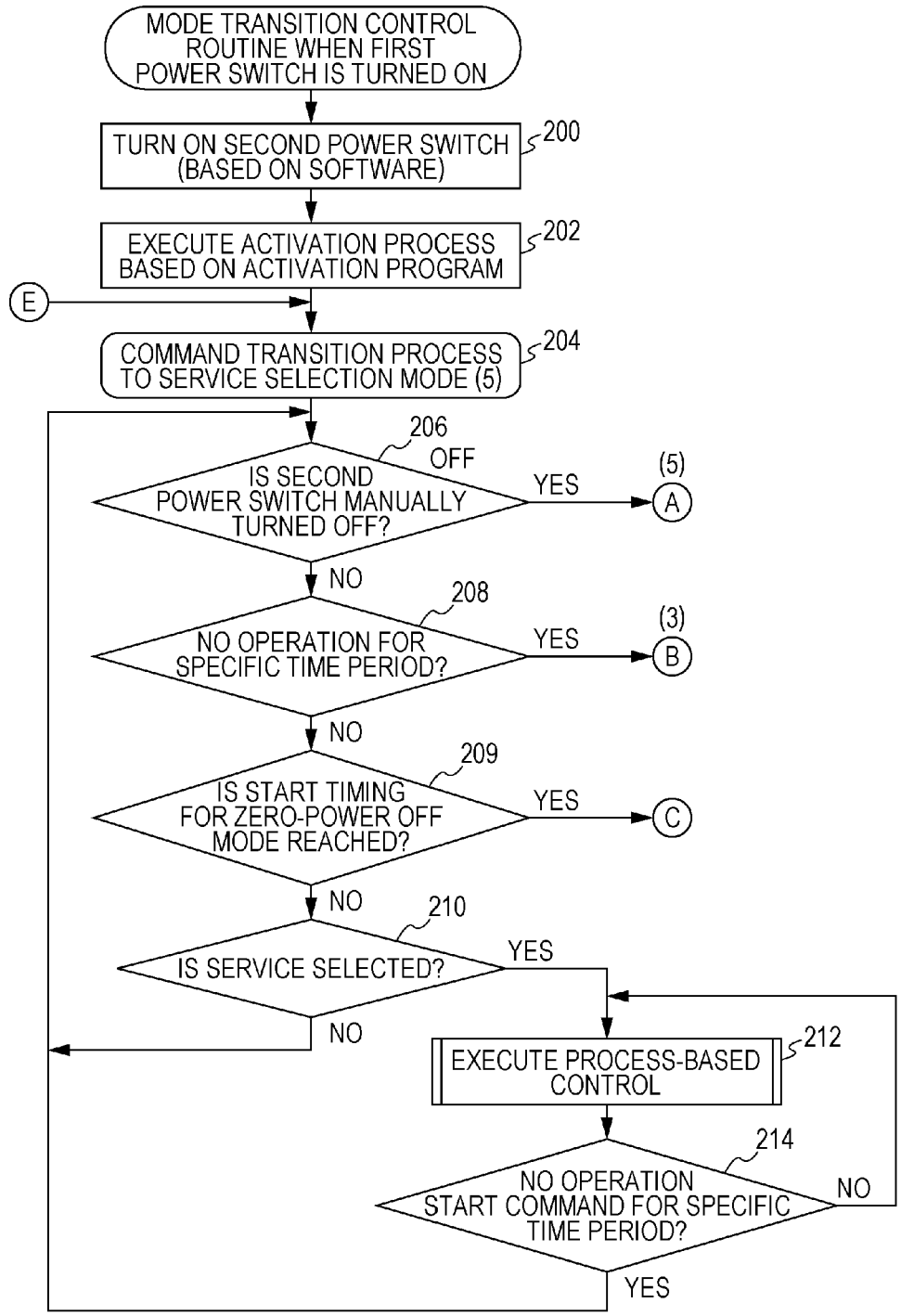

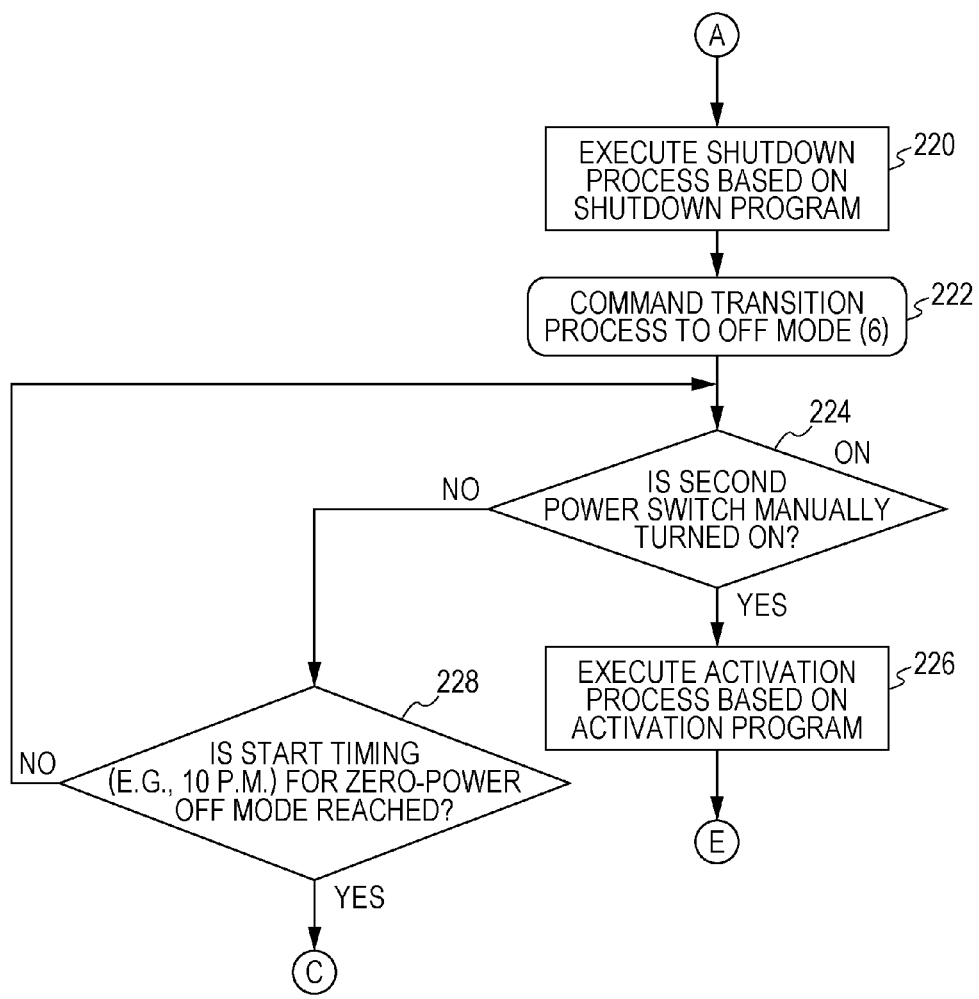

POWER SUPPLY CONTROL DEVICE AND IMAGE PROCESSING APPARATUS

CROSS-REFERENCE TO RELATED APPLICATIONS

This application is based on and claims priority under 35 USC 119 from Japanese Patent Application No. 2013-243170 filed Nov. 25, 2013.

BACKGROUND

Technical Field

The present invention relates to power supply control devices and image processing apparatuses.

SUMMARY

According to an aspect of the invention, there is provided a power supply control device including a first power supply unit, a second power supply unit, and a mode controller. The first power supply unit receives electric power supplied from a commercial power source. The second power supply unit receives electric power supplied from an accumulative power source. The mode controller controls a power-supplied object to one of a group of modes, which at least include a first mode in which the electric power is supplied from the first power supply unit and the second power supply unit and a second mode in which the electric power is supplied from the second power supply unit, and sets the power-supplied object in the first mode and subsequently causes the power-supplied object to transition to the second mode.

BRIEF DESCRIPTION OF THE DRAWINGS

An exemplary embodiment of the present invention will be described in detail based on the following figures, wherein:

FIGS. 4A and 4B illustrate a mode transition diagram of the image processing apparatus according to this exemplary embodiment;

FIG. 5 is a flowchart illustrating a control routine executed when a first power switch is operated, in accordance with this exemplary embodiment;

FIG. 6 is a flowchart illustrating a control routine executed when a second power switch is manually turned off, in accordance with this exemplary embodiment;

DETAILED DESCRIPTION

Figure 1:
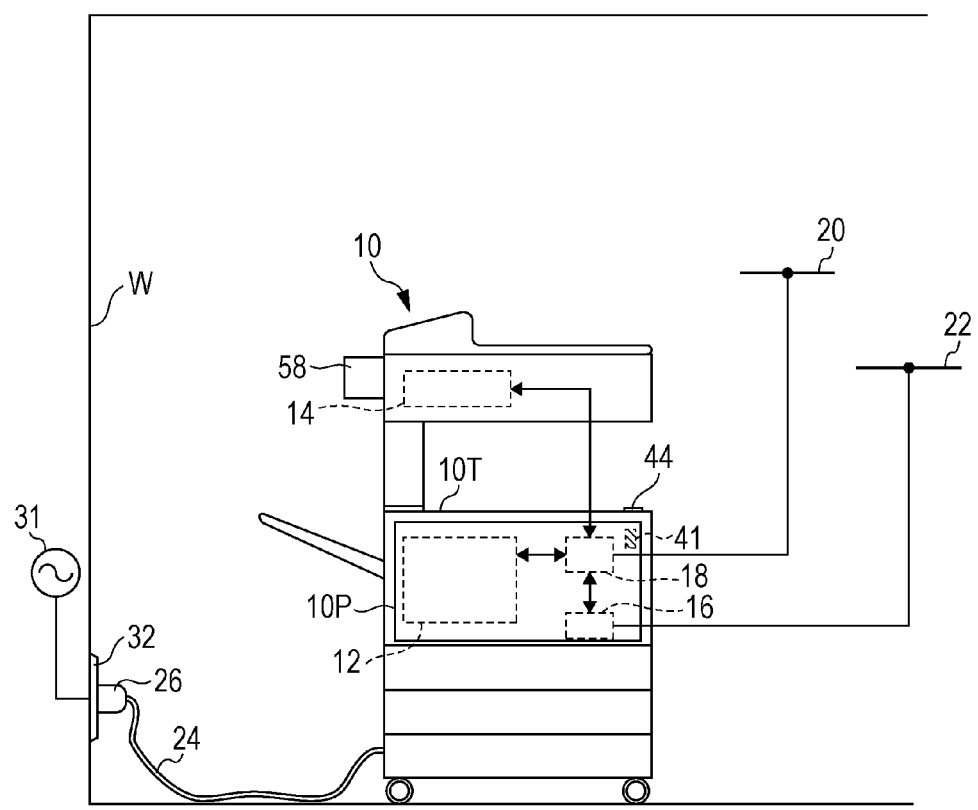
FIG. 1 schematically illustrates an image processing apparatus according to an exemplary embodiment.

FIG. 1 illustrates an image processing apparatus 10 according to an exemplary embodiment.

The image processing apparatus 10 includes processors (sometimes referred to as "devices" hereinafter), which include an image forming unit 12 that forms an image onto recording paper, an image reading unit 14 that reads a document image, and a facsimile communication control circuit 16. A recording-paper output tray 10T onto which the recording paper having the image formed thereon by the image forming unit 12 is output is formed between the image forming unit 12 and the other devices (i.e., the image reading unit 14 and the facsimile communication control circuit 16)

The image processing apparatus 10 includes a controller 18 that controls the image forming unit 12, the image reading unit 14, and the facsimile communication control circuit 16 so as to, for example, temporarily store image data of the document image read by the image reading unit 14 or send the read image data to the image forming unit 12 or the facsimile communication control circuit 16.

The controller 18 is connected to a communication network 20, such as the Internet, and the facsimile communication control circuit 16 is connected to a telephone network 22. For example, the controller 18 is connected to a personal computer (PC) 29 (see FIG. 2) via the communication network 20 and has a function of receiving image data as well as performing facsimile reception and facsimile transmission by using the telephone network 22 via the facsimile communication control circuit 16.

The image reading unit 14 is provided with a document tray for positioning a document, a scan drive system that radiates light onto an image of the document placed on the document tray while scanning the image, and a photoelectric conversion element, such as a charge-coupled device (CCD), which receives the light reflected or transmitted due to the scanning of the scan drive system and converts the light into an electric signal.

The image forming unit 12 includes a photoconductor. The photoconductor is surrounded by a charging unit that uniformly charges the photoconductor, a scan exposure unit that scans a light beam based on the image data, an image developing unit that develops an electrostatic latent image formed as a result of the scan exposure process performed by the scan exposure unit, a transfer unit that transfers the developed image on the photoconductor onto the recording paper, and a cleaning unit that cleans the surface of the photoconductor after the transfer process. Furthermore, a fixing unit that fixes the image onto the recording paper after the transfer process is provided in a recording-paper transport path.

The image processing apparatus 10 has a power plug 26 attached to an end of an input power cable 24 thereof. By plugging the power plug 26 into a power socket 32 of a commercial power source 31 wired to a wall surface W, the image processing apparatus 10 receives electric power supplied from the commercial power source 31.

The image processing apparatus 10 according to this exemplary embodiment is supplied with electric power from the commercial power source 31 by turning on a first power switch 41. The first power switch 41 is, for example, a so-called seesaw switch. When the switch is operated by a user (human), a seesaw-shaped operable section of the switch is physically moved so that the switch is turned on and off. Therefore, the on and off states of the first power switch 41 are visually recognizable.

The first power switch 41 is provided as a part of an internal component that is exposable by opening a front panel 10P of the image processing apparatus 10 (e.g., by rotating the panel 10P about a lower edge thereof).

Furthermore, in this exemplary embodiment, a second power switch 44 is provided in addition to the first power switch 41.

The second power switch 44 is a so-called soft-switch that is provided in the form of an automatically-restorable push-button switch in a section of the recording-paper output tray 10T. Specifically, when the second power switch 44 is pressed, internal electric contacts come into contact with each other. When the second power switch 44 is released, the electric contacts come out of contact with each other. The controller 18 monitors the electric contacts of the second power switch 44 and determines that a command signal for changing a device operation mode is input every time the electric contacts come into contact with each other (i.e., every time the second power switch 44 is operated).

Control System of Image Processing Apparatus

Figure 2:
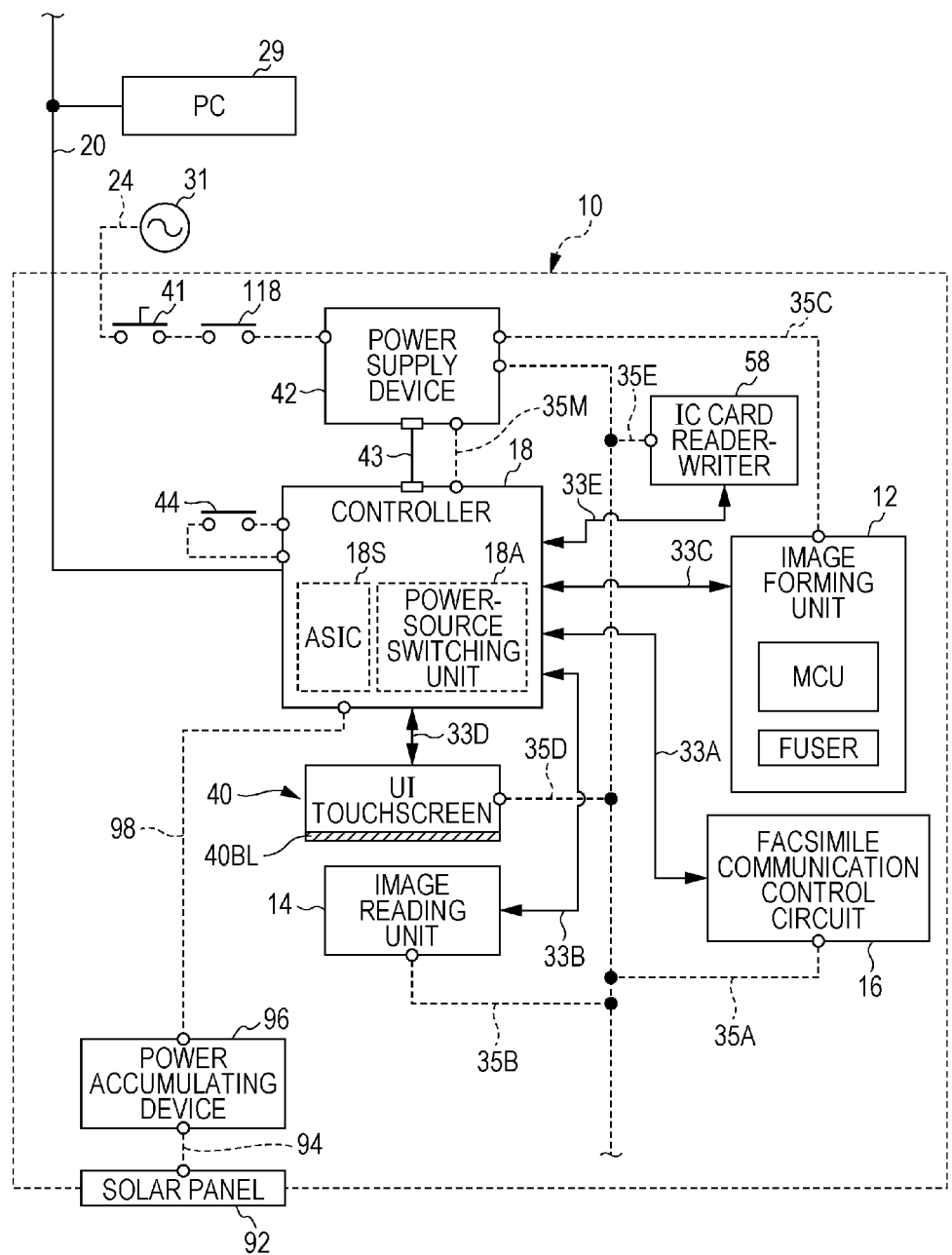
FIG. 2 is a block diagram illustrating the configuration of a power supply system and a control system in the image processing apparatus according to this exemplary embodiment.

FIG. 2 schematically illustrates a hardware configuration of a control system of the image processing apparatus 10.

The communication network 20 is connected to the controller 18 of the image processing apparatus 10. The communication network 20 is connected to the PC (terminal apparatus) 29 that may serve as an image-data transmission source.

The controller 18 is connected to the facsimile communication control circuit 16, the image reading unit 14, the image forming unit 12, and a user-interface (UI) touchscreen 40, and also optionally to an integrated-circuit (IC) card reader-writer 58 via buses 33A to 33E, such as data buses or control buses, respectively. Specifically, the controller 18 is configured to control each processor of the image processing apparatus 10. The UI touchscreen 40 has a UI-touchscreen backlight unit 40BL attached thereto.

Furthermore, the image processing apparatus 10 includes a power supply device 42 that is connected to the controller 18 by a signal harness 43.

The power supply device 42 receives electric power supplied from the commercial power source 31 via the input power cable 24. In the input power cable 24, the first power switch 41 and a first power relay switch 118, which will be described later, are connected in series. The following description is based on an assumption that the first power relay switch 118 is turned on, unless otherwise noted.

The power supply device 42 supplies electric power to the controller 18 via a low voltage power supply (LVPS) 42A (see FIG. 3) (see a power supply line 35M indicated by a dotted line in FIG. 2) and is provided with power supply lines 35A to 35E used for supplying electric power independently to the remaining devices, which are the facsimile communication control circuit 16, the image reading unit 14, the image forming unit 12, the UI touchscreen 40, and the IC card reader-writer 58, respectively. Therefore, the controller 18 is capable of performing so-called partial power-saving control for supplying electric power or cutting off the supply of electric power to the individual devices.

When the first power switch 41 is turned on, electric power is supplied to the controller 18 of the image processing apparatus 10. Immediately after this first power switch 41 is turned on, minimal activation operation (initial operation) is executed in the controller 18. After the controller 18 is activated in response to turning on of the first power switch 41, the second power switch 44 is turned on so that the electric power from the commercial power source 31 is appropriately supplied to the various devices, such as the image reading unit 14, the image forming unit 12, and the facsimile communication control circuit 16, whereby the devices become operable.

Mode Management

In a state where the first power switch 41 and the second power switch 44 are both turned on, that is, in a state where all of the functions of the image processing apparatus 10 are executable, for example, if there is no reception of a subsequent service selection even after a specific period has elapsed since completion of a process corresponding to a current service, a power-saving mode is executed by turning off the UI-touchscreen backlight unit 40BL of the UI touchscreen 40 and cutting off the supply of electric power to the individual devices. In this case, the controller 18 is continuously supplied with electric power (i.e., a sleep mode).

Therefore, in the sleep mode in which the second power switch 44 is turned on, a service selection, such as a print command or facsimile reception, is acceptable, and a process corresponding to the service selection is executable.

On the other hand, when the second power switch 44 is turned off, none of the services, including facsimile reception, is acceptable (i.e., off mode).

When the first power switch 41 is turned on and the second power switch 44 is turned off, a part of the controller 18 is supplied with standby electric power from the commercial power source 31, which is to be used for reactivation when the second power switch 44 is turned on again.

In this exemplary embodiment, a second power source unit (i.e., a power accumulating device 96, which will be described later in detail) is provided as a power supply source independent of the commercial power source 31. In the sleep mode, the supply of electric power from the commercial power source 31 is sometimes cut off, and the aforementioned minimal electric power is sometimes supplied from the power accumulating device 96. As a result, since the supply of electric power from the commercial power source 31 becomes zero, a sleep mode in which the power accumulating device 96 is used will be referred to as "zero-power sleep mode".

Furthermore, in this exemplary embodiment, as measures for further saving energy, standby electric power to be used for reactivating the controller 18 in a state equivalent to when the first power switch 41 is turned off is sometimes supplied from the power accumulating device 96. This mode will be referred to as "zero-power off mode". The measures for further saving energy based on this zero-power off mode will be described later.

Power Accumulating Device 96 (Second Power Source Unit)

In this exemplary embodiment, a photovoltaic power system is used as the second power source unit (i.e., the power accumulating device 96) for supplying electric power to the controller 18 during the zero-power sleep mode and the zero-power off mode. This second power source unit may be used under one condition in which a sufficient amount of charge is ensured for each of the modes.

Specifically, as shown in FIG. 2, a solar panel 92 is installed in the image processing apparatus 10. For example, the solar panel 92 may be entirely or partly attached to the surface of a housing or may be disposed distant from the image processing apparatus 10.

The solar panel 92 is connected to the power accumulating device 96 via a dedicated wire 94. The electric power accumulated in the power accumulating device 96 is transferrable to the controller 18 via a power supply line 98.

The controller 18 is provided with a power-source switching unit 18A and a secondary controller (application specific integrated circuit (ASIC)) 18S. The power-source switching unit 18A includes a power-source drive circuit 116 and a power-source switch 117 (see FIG. 3). The power-source switching unit 18A switches between power supply sources (i.e., the commercial power source 31 and the power accumulating device 96).

Although the power-source switching unit 18A is described as being a built-in component of the controller 18 in this exemplary embodiment, the power-source switching unit 18A may alternatively be provided independently of the controller 18. For example, the power-source switching unit 18A may be provided by using an independent circuit board.

In the aforementioned sleep mode (i.e., the zero-power sleep mode) or the aforementioned off mode (i.e., the zero-power off mode), the ASIC 18S has a function of cutting off the supply of electric power to a central processing unit (CPU) 100 (or may sometimes conduct a portion of the electric power), executing a system-program deployment process at the time of activation of the CPU 100, and managing the stop timing of the zero-power off mode in correspondence with the start timing of the zero-power off mode managed by the CPU 100.

The management of the start timing of the zero-power off mode by the CPU 100 may alternatively be performed by the ASIC 18S. Furthermore, the time management of the zero-power off mode may alternatively be performed by the power-source switching unit 18A.

In the sleep mode (i.e., the zero-power sleep mode) in which the supply of electric power to the controller 18 is limited, the ASIC 18S is entirely supplied with electric power. In the off mode (i.e., the zero-power off mode), the ASIC 18S is partially supplied with electric power.

Further Energy-Saving Mode

Because the amount of charge in the power accumulating device 96 fluctuates, a sufficient amount of charge is not necessarily always ensured. Therefore, a further energy-saving mode is sometimes executed, in which the power consumption in the power accumulating device 96 is reduced relative to that in the aforementioned off mode. For example, the further energy-saving mode is executed outside business hours, such as in the nighttime (i.e., during hours in which there is a low possibility that the image processing apparatus 10 may be used).

Specifically, in this case, in a situation where the user may be absent from the location where the image processing apparatus 10 is installed (such as in an office) during the night hours starting from the close of business on the current day to the start of business in the following morning, the user has to manually turn off the first power switch 41 before leaving the location after closing business on that day. If the first power switch 41 is manually turned off, the first power switch 41 would have to be manually turned on when starting business again.

When the first power switch 41 is turned off, the image processing apparatus 10 becomes completely cut off from the supply of electric power so that the power consumption of the commercial power source 31 becomes completely zero. When the first power switch 41 is manually turned on in the following morning, the controller 18 is activated by being supplied with electric power from the commercial power source 31.

However, under present circumstances, the further energy-saving mode is only achievable by manually turning on the first power switch 41. Moreover, the time it takes for the image processing apparatus 10 to become usable after the manual operation is longer than that when the ASIC 18S is partially or entirely supplied with electric power from the power accumulating device 96, thus resulting in reduced user-friendliness. In addition, it takes a long time to turn off the first power switch 41 from, for example, a standby mode, thus resulting in a long waiting time.

In this exemplary embodiment, the further energy-saving mode is achieved without having to manually turn on and off the first power switch 41.

Figure 3:
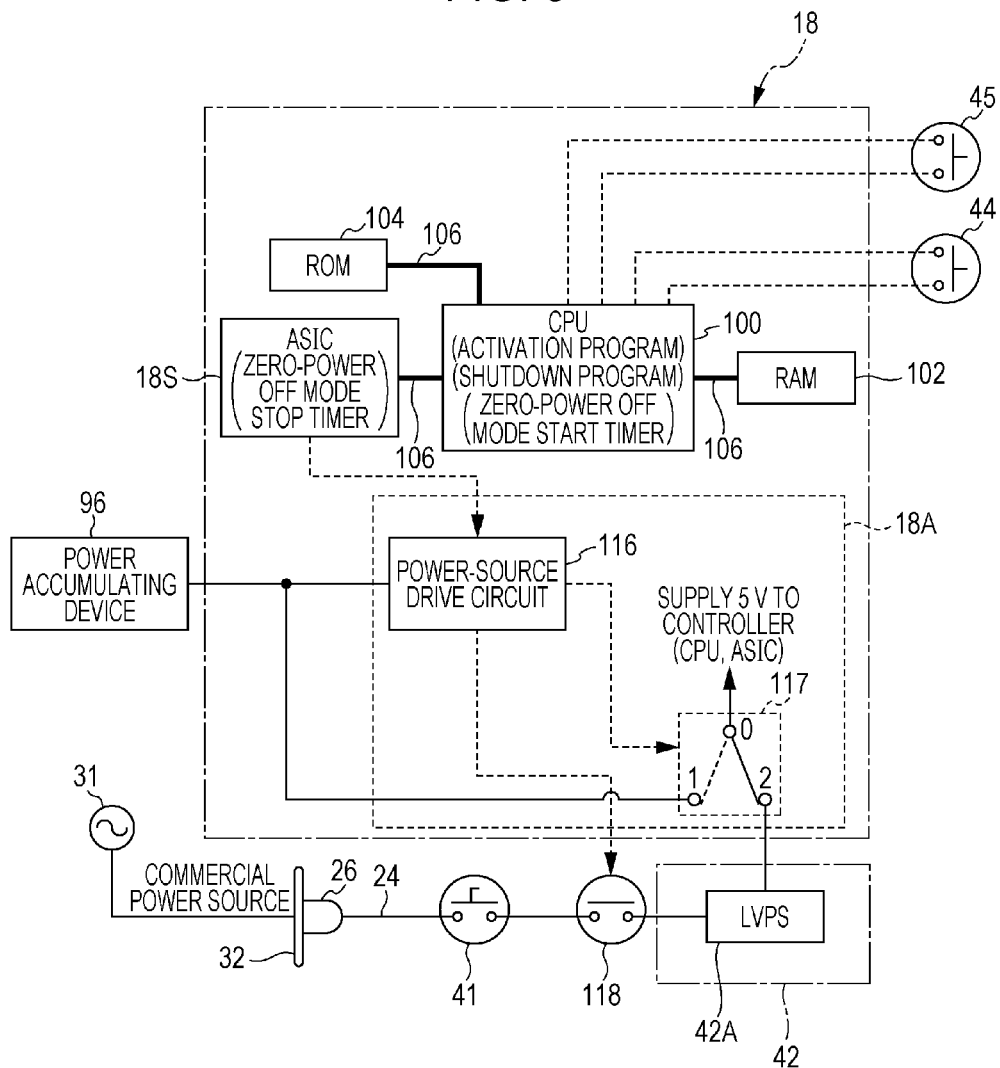
FIG. 3 is a block diagram illustrating the operation during a power-saving mode in a controller according to this exemplary embodiment.

Specifically, as shown in FIG. 3, in the image processing apparatus 10 according to this exemplary embodiment, the first power relay switch 118 is provided in the input power cable 24 at an upstream side of the first power switch 41 (i.e., a side closer toward the power supply device 42). The first power relay switch 118 may be turned on and off by being controlled by the power-source switching unit 18A of the controller 18. As an alternative to the first power relay switch 118, another type of control switch, such as a triac, may be provided.

After a preset time (e.g., 10 p.m.), the controller 18 (i.e., the ASIC 18S) turns off the first power relay switch 118 via, for example, the off mode.

In this case, the power accumulating device 96 does not have to retain standby electric power to be used for reactivating the controller 18. In addition to ensuring enough electric power to be supplied in the off mode, the power accumulating device 96 only has to ensure enough electric power for performing on-off control of the first power relay switch 118 and enough electric power for switching the power source from the power accumulating device 96 to the commercial power source 31 (i.e., electric power for restoring the off mode).

When a preset time (e.g., 7 a.m.) is reached in this state, the first power relay switch 118 is turned on by the electric power from the power accumulating device 96 and the power source is switched from the power accumulating device 96 to the commercial power source 31 (i.e., the off mode is restored). In this state, standby electric power to be used for reactivating the controller 18 becomes reliably suppliable from the commercial power source 31. This period in which the first power relay switch 118 is turned off and electric power is not supplied from the commercial power source 31 is defined as "zero-power off mode" relative to the off mode.

Figure 4A:
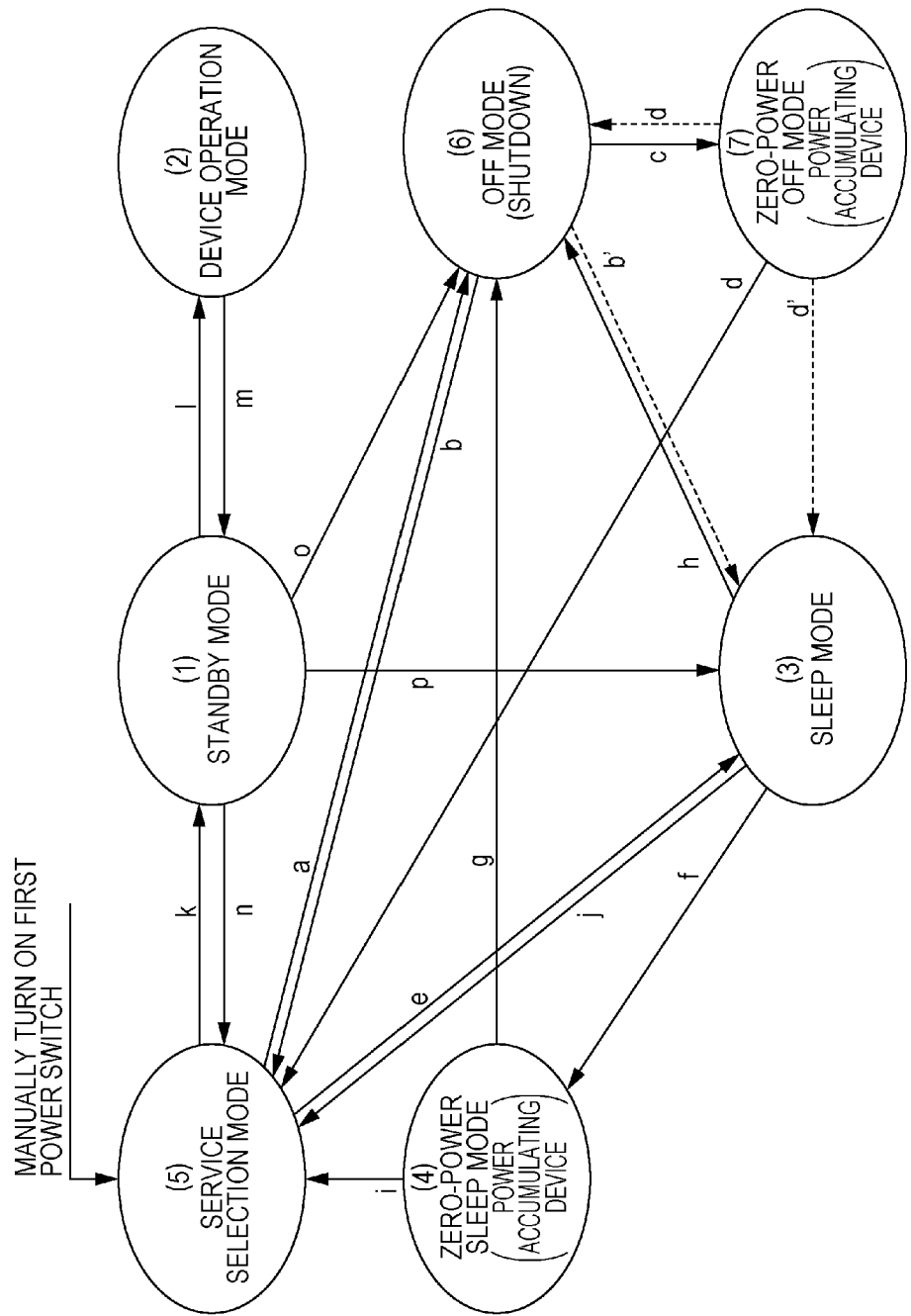

FIGS. 4A and 4B illustrate a mode transition diagram of the image processing apparatus 10 according to this exemplary embodiment. For the sake of convenience, reference characters (1) to (7) in FIGS. 4A and 4B denote identification characters given to the respective modes. Specifically, reference character (1) denotes a standby mode, (2) denotes a device operation mode, (3) denotes a sleep mode, (4) denotes a zero-power sleep mode, (5) denotes a service selection mode, (6) denotes an off mode, and (7) denotes a zero-power off mode.

Each of the arrows in FIG. 4A indicates a transition pattern that connects a transition source and a transition destination. Reference characters a to p given to the arrows indicating the respective transition patterns denote processes executed based on, for example, transition conditions shown in FIG. 4B. The transition patterns a to p in FIGS. 4A and 4B will be described in detail below (in accordance with explanatory legends in FIG. 4B).

The transition pattern a is a transition pattern from the service selection mode to the off mode. The transition is made when the second power switch 44 is manually turned off or when the start timing for the zero-power off mode is reached.

The transition pattern b is a transition pattern from the off mode to the service selection mode. The transition is made when the second power switch 44 is manually turned on.

The transition pattern c is a transition pattern from the off mode to the zero-power off mode. The transition is made when the start timing for the zero-power off mode is reached and the amount of charge in the power accumulating device 96 is sufficient.

The transition pattern d is a transition pattern from the zero-power off mode to the off mode. The transition is made when the stop timing for the zero-power off mode is reached.

The transition pattern e is a transition pattern from the service selection mode to the sleep mode. The transition is made when there is no operation for a specific time period.

The transition pattern f is a transition pattern from the sleep mode to the zero-power sleep mode. The transition is made when the amount of charge in the power accumulating device 96 is sufficient. Specifically, the zero-power sleep mode may be an alternative to the sleep mode if the amount of charge in the power accumulating device 96 is sufficient.

The transition pattern g is a transition pattern from the zero-power sleep mode to the off mode. The transition is made when the second power switch 44 is manually turned off or when the start timing for the zero-power off mode is reached. However, in this case, the transition may be made directly to the zero-power off mode since the power source is already switched to the power accumulating device 96.

The transition pattern h is a transition pattern from the sleep mode to the off mode. The transition is made when the second power switch 44 is manually turned off or when the start timing for the zero-power off mode is reached.

The transition pattern i is a transition pattern from the zero-power sleep mode to the service selection mode. The transition is made in response to a restore command. A restore command may include, for example, operation performed on a power-saving control switch 45 (see FIG. 3) or approaching of a human toward the image processing apparatus 10 if a human detection sensor is provided.

In this exemplary embodiment, although the transition is made directly from the zero-power sleep mode to the service selection mode as in the transition pattern i, the transition may be made temporarily to the sleep mode from the zero-power sleep mode and then to the service selection mode.

The transition pattern j is a transition pattern from the sleep mode to the service selection mode. The transition is made in response to a restore command. A restore command may include, for example, operation performed on the power-saving control switch 45 (see FIG. 3) or approaching of a human toward the image processing apparatus 10 if a human detection sensor is provided.

The transition pattern k is a transition pattern from the service selection mode to the standby mode. The transition is made when a service is selected. Examples of service selection include operation performed on a menu button, operation performed on a function button, and so on.

The transition pattern l is a transition pattern from the standby mode to the device operation mode. The transition is made in response to a device-operation start command.

The transition pattern m is a transition pattern from the device operation mode to the standby mode. The transition is made when the operation ends.

The transition pattern n is a transition pattern from the standby mode to the service selection mode. The transition is made when, for example, the menu button is operated.

The transition pattern o is a transition pattern from the standby mode to the off mode. The transition is made when the second power switch 44 is manually turned off or when the start timing for the zero-power off mode is reached.

The transition pattern p is a transition pattern from the standby mode to the sleep mode. The transition is made in response to a power-saving command. A power-saving command may include, for example, operation performed on the power-saving control switch 45 (see FIG. 3), no reception of an operation start command for a specific time period, or withdrawal of a human from the image processing apparatus 10 if a human detection sensor is provided.

The transition patterns shown in FIGS. 4A and 4B are examples and may be appropriately changed based on the specifications. For example, by changing the transition pattern b to a transition pattern b', a further enhanced energy-saving configuration may be achieved.

Power Supply Control

FIG. 3 is a block diagram for mode transition and power supply control in the controller 18. For example, the transition to the zero-power off mode and the transition from the zero-power off mode to, for example, the service selection mode are realized by timer management.

As shown in FIG. 3, the controller 18 includes the CPU 100, a memory (random access memory (RAM)) 102, a read-only memory (ROM) 104, the ASIC 18S, and buses 106 (see thick bold lines in FIG. 3) that connect these components. In FIG. 3, narrow lines and dotted lines that are shown separately from the thick bold lines denoting the buses 106 denote power supply lines and signal lines, respectively. Furthermore, in this exemplary embodiment, an I/O and an I/F for connecting to the CPU 100 and peripheral functional components, which will be described later, are omitted.

The CPU 100 is connected to the second power switch 44 and the power-saving control switch 45.

The controller 18 receives electric power supplied from the power supply device 42. The first power relay switch 118 that cuts off the input power cable 24 is provided between the first power switch 41, which is provided upstream of the power supply device 42, and the power supply device 42.

The first power relay switch 118 is on-off controlled by the power-source switching unit 18A (i.e., the power-source drive circuit 116, which will be described later). When this first power relay switch 118 is turned off during the off mode, the aforementioned zero-power off mode is achieved.

The CPU 100 executes an activation process based on an activation program, a shutdown process based on a shutdown program, and a zero-power-off-mode start timer process for managing the start timing of the zero-power off mode.

The ASIC 18S executes a power-source switching process (between the commercial power source 31 (i.e., the LVPS 42A) and the power accumulating device 96) and a zero-power-off-mode stop timer process for managing the stop timing of the zero-power off mode.

The CPU 100 and the ASIC 18S are connected to the power-source drive circuit 116 of the power-source switching unit 18A. In order to transition the controller 18 to the zero-power off mode at a preset time (e.g., 10 p.m.), the CPU 100 outputs a command signal, to the ASIC 18S, for causing the power-source drive circuit 116 to turn off the first power relay switch 118.

Furthermore, during the zero-power off mode, the ASIC 18S outputs a command signal at a preset time (e.g., 7 a.m.) for causing the power-source drive circuit 116 to turn on the first power relay switch 118 so as to switch the power source to the commercial power source 31 and command the CPU 100 to execute an activation process.

The power-source drive circuit 116 is connected to the power-source switch 117 and controls switching of the power-source switch 117. The power-source switch 117 has a first contact (1) that is connected to a power supply line of the power accumulating device 96, and a second contact (2) that is connected to the LVPS 42A of the power supply device 42. Furthermore, a common terminal (0) of the power-source switching unit 18A is connected to a power supply line used for supplying electric power to the controller 18.

The power-source switch 117 has a function for switching between the power supply sources for the controller 18. When the power-source switch 117 is switched to the first contact (1), the power accumulating device 96 serves as the power source, and when the power-source switch 117 is switched to the second contact (2), the power supply device 42 (i.e., the LVPS 42A) serves as the power supply source.

The power-source switch 117 is not limited to the structure in this exemplary embodiment. For example, the switching process based on a switch may be omitted by employing a circuit configuration in which a diode is provided such that backflow toward the multiple power supply sources does not occur.

Relationships Among Shutdown Process, Activation Process, and Zero-Power Off Mode In this exemplary embodiment, when a user of the image processing apparatus 10 does not desire to use the apparatus, the user may manually turn off the second power switch 44 so that a shutdown process is executed, thereby subsequently causing a transition to the off mode.

In this case, if the aforementioned user is the last person leaving the area where the apparatus is installed (such as an office), the user would leave the area after manually turning off the first power switch 41 for further saving energy. However, in order to turn off the first power switch 41, the user has to wait for the shutdown process to be completed after manually turning off the second power switch 44.

In this exemplary embodiment, an automatic transition to the off mode is made and the first power relay switch 118 is automatically turned off when a preset time (e.g., 10 p.m.) later than the time at which the last person leaves the area is reached, regardless of the on and off states of the second power switch 44. As a result, the user does not have to wait for the shutdown process to be completed.

Furthermore, if the first power switch 41 is manually turned off, the user would have to manually turn on the first power switch 41 when the user enters the area on the following day. By manually turning on the first power switch 41, an activation process is executed for the first time (i.e., the second power switch 44 is turned on based on software). This leads to a long waiting time until the image processing apparatus 10 becomes usable.

In this exemplary embodiment, based on a condition in which the first power switch 41 is maintained in an on state and the first power relay switch 118 is in an off state, the first power relay switch 118 is automatically turned on when a preset time (e.g., 7 a.m.) earlier than the time at which the first person enters the area is reached. In this case, the waiting time for the activation process may be reduced.

The operation of this exemplary embodiment will be described below.

FIG. 4 is a mode transition diagram of the image processing apparatus 10 according to this exemplary embodiment. A mode transition is controlled based on flowcharts shown in FIGS. 5 to 8.

Control Executed when First Power Switch is Turned on

FIGS. 5 to 8 are flowcharts illustrating a mode-transition control routine executed when the first power switch 41 is turned on.

When the first power switch 41 is (manually) turned on, the second power switch 44 is turned on based on software in step 200 in FIG. 5. Then, the operation proceeds to step 202 where an activation process is executed based on a preset activation program. The operation then proceeds to step 204.

In step 204, a transition process to the service selection mode is commanded. The operation then proceeds to step 206.

In step 206, it is determined whether or not the second power switch 44 is manually turned off. If a negative determination result is obtained, the operation proceeds to step 208 where it is determined whether or not a non-operating state is continuing for a specific time period.

If a negative determination result is obtained in step 208, the operation proceeds to step 209 where it is determined whether or not a start timing (e.g., 10 p.m.) for the zero-power off mode is reached.

If a negative determination result is obtained in step 209, the operation proceeds to step 210 where it is determined whether or not a service (such as copy) is selected. If a negative determination result is obtained, the operation returns to step 206.

In other words, until a positive determination result is obtained in any one of steps 206, 208, 209, and 210, steps 206, 208, 209, and 210 are repeated.

While repeating steps 206, 208, 209, and 210, if a positive determination result is obtained in step 206, that is, if it is determined that the second power switch 44 is manually turned off, it is determined that the user desires to cease the use of the apparatus. In this case, the operation proceeds to step 220 in FIG. 6 from step 206.

Furthermore, while repeating steps 206, 208, 209, and 210, if a positive determination result is obtained in step 208, that is, if it is determined that the non-operating state has continued for the specific time period, it is determined that it is time for a power-saving mode. In this case, the operation proceeds to step 250 in FIG. 7 from step 208.

A determination process similar to the process for determining whether the non-operating state is continuing for the specific time period in step 208 includes determining whether or not the power-saving control switch 45 is operated. Therefore, if the power-saving control switch 45 is manually operated, a control process equivalent to that when a positive determination result is obtained in step 208 may be performed.

Furthermore, while repeating steps 206, 208, 209, and 210, if a positive determination result is obtained in step 209, that is, if it is determined that the start timing for the zero-power off mode is reached, it is determined that it is time for making a transition to the zero-power off mode. In this case, the operation proceeds to step 280 in FIG. 8 from step 209.

Furthermore, while repeating steps 206, 208, 209, and 210, if a positive determination result is obtained in step 210, that is, if it is determined that a service (such as copy) is selected, it is determined that the user desires to command a process using the devices. In this case, the operation proceeds from step 210 to step 212 where control based on the process (i.e., control for switching back and forth between the standby mode and the device operation mode in FIG. 4) is executed. Then, if there is no operation start command for a specific time period in step 214, the operation proceeds to step 206.

Control Executed when Second Power Switch 44 is Manually Turned Off

FIG. 6 illustrates a routine executed when a positive determination result is obtained in step 206 in FIG. 5. In step 220, a shutdown process is executed based on a preset shutdown program. Then, the operation proceeds to step 222 where a transition process to the off mode is commanded. The operation then proceeds to step 224.

In step 224, it is determined whether or not the second power switch 44 is manually turned on. If a positive determination result is obtained in step 224, the operation proceeds to step 226 where an activation process is executed based on a preset activation program. The operation then proceeds to step 204 (service selection mode) in FIG. 5.

If a negative determination result is obtained in step 224, the operation proceeds to step 228 where it is determined whether or not the start timing (e.g., 10 p.m.) for the zero-power off mode is reached.

If a negative determination result is obtained in step 228, the operation returns to step 224. If a positive determination result is obtained in step 228, it is determined that the start timing for the zero-power off mode is reached during the off mode. In this case, the operation proceeds to step 280 in FIG. 8 from step 228.

Control Executed when Making Transition to Sleep Mode

Figure 7:
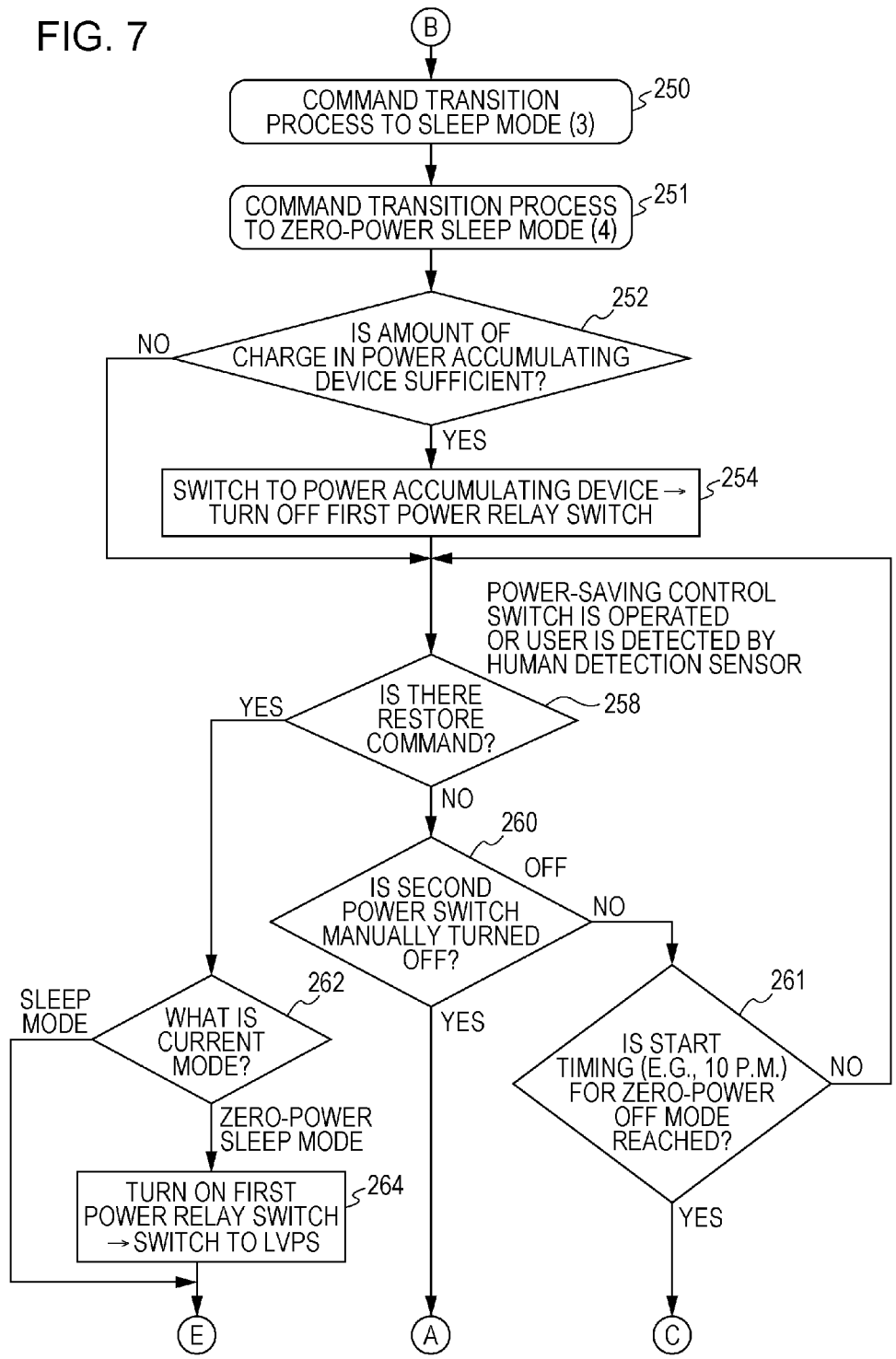
FIG. 7 is a flowchart illustrating a control routine executed when a transition to a sleep mode is made, in accordance with this exemplary embodiment.

FIG. 7 is a routine executed when a positive determination result is obtained in step 208 in FIG. 5. In step 250, a transition process to the sleep mode is commanded. Then, the operation proceeds to step 251 where a transition process to the zero-power sleep mode is commanded. The operation then proceeds to step 252.

In step 252, it is determined whether or not the amount of charge in the power accumulating device 96 is sufficient. If a positive determination result is obtained, the operation proceeds to step 254. In step 254, the power source is switched from the LVPS 42A to the power accumulating device 96 and the first power relay switch 118 is subsequently turned off. The operation then proceeds to step 258.

If a negative determination result is obtained in step 252, the operation proceeds to step 258.

In step 258, it is determined whether or not a restore command is received. A restore command may include, for example, a print request, operation performed on the power-saving control switch 45, or approaching of a human detected by a human detection sensor if the human detection sensor is provided.

If a negative determination result is obtained in step 258, the operation proceeds to step 260 where it is determined whether or not the second power switch 44 is manually turned off. If a negative determination result is obtained in step 260, the operation proceeds to step 261 where it is determined whether or not the start timing (e.g., 10 p.m.) for the zero-power off mode is reached.

If a negative determination result is obtained in step 261, the operation returns to step 258. Until a positive determination result is obtained in any one of steps 258, 260, and 261, steps 258, 260, and 261 are repeated.

If a positive determination result is obtained in step 258, it is determined that the user desires to use the apparatus, and the operation proceeds to step 262. In step 262, the current mode is determined (zero-power sleep mode or sleep mode). If it is determined that the current mode is the zero-power sleep mode, the operation proceeds to step 264 where the first power relay switch 118 is turned on and the power source is subsequently switched from the power accumulating device 96 to the LVPS 42A. Then, the operation proceeds to step 204 (service selection mode) in FIG. 5.

If it is determined in step 262 that the current mode is the sleep mode, the operation proceeds to step 204 (service selection mode) in FIG. 5 since the currently-used power source is the LVPS 42A.

On the other hand, if a positive determination result is obtained in step 260, it is determined that the user desires to cease the use of the apparatus. In this case, the operation proceeds to step 220 in FIG. 6.

If a positive determination result is obtained in step 261, it is determined that it is time for making a transition to the zero-power off mode. In this case, the operation proceeds to step 280 in FIG. 8 from step 261.

Control Executed when Start Timing for Zero-Power Sleep Mode is Reached

Figure 8:
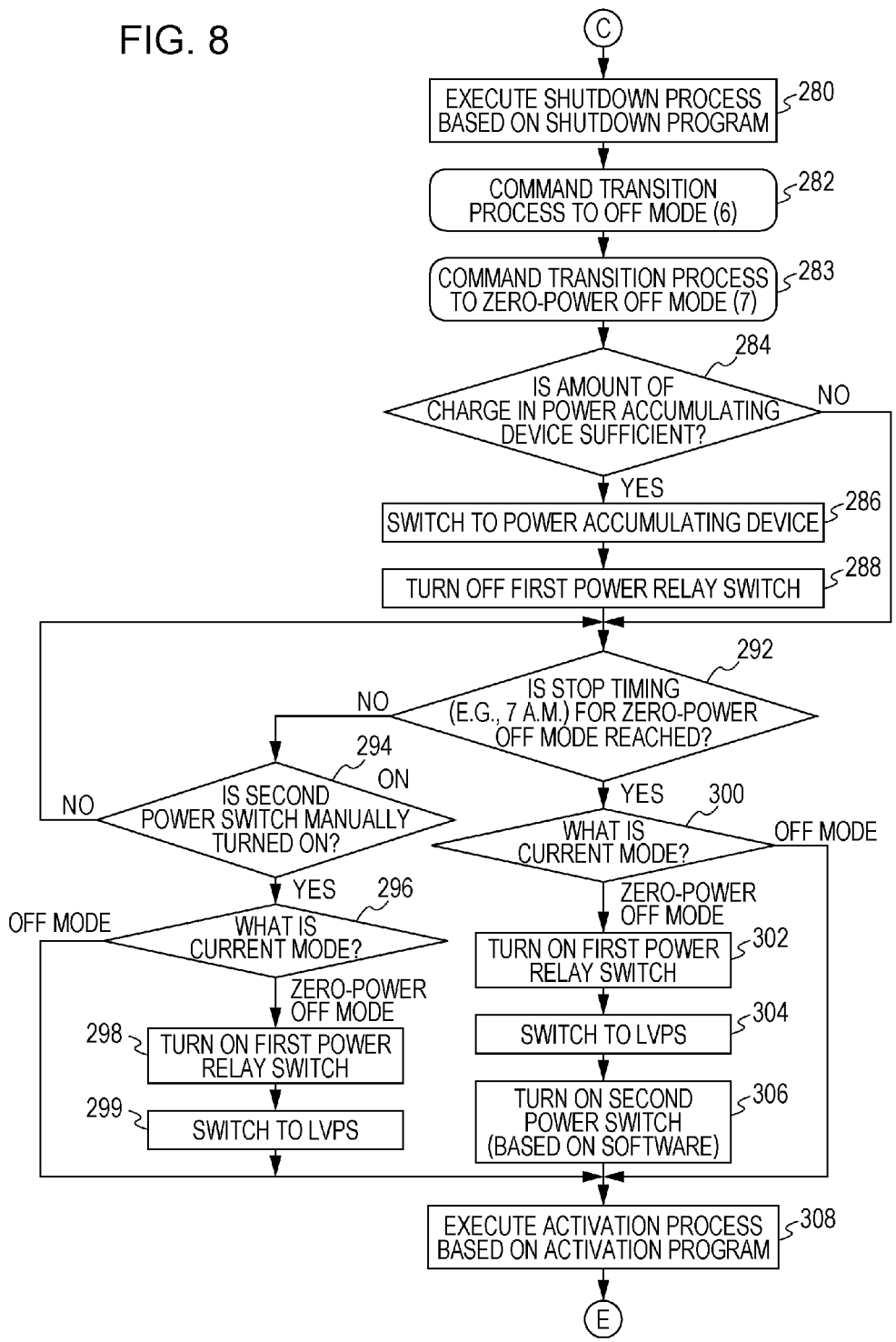
FIG. 8 is a flowchart illustrating a control routine executed when a start timing for a zero-power off mode is reached, in accordance with this exemplary embodiment.

FIG. 8 illustrates a routine executed when a position determination result is obtained in step 209 in FIG. 5, when a position determination result is obtained in step 228 in FIG. 6, or when a position determination result is obtained in step 261 in FIG. 7.

When executing this routine in FIG. 8, a monitoring process for detecting reception of a job (service) commences at a predetermined time prior to (e.g., 10 minutes prior to) the start timing for the zero-power off mode. If there is reception, the start timing for the zero-power off mode may be delayed by a predetermined time (e.g., 30 minutes) in view of user-friendliness.

Furthermore, if user-friendliness is to be emphasized, after the aforementioned delaying process, a monitoring process for detecting another reception of a job (service) may commence at a predetermined time prior to (e.g., 10 minutes prior to) reaching the delayed time. If there is reception, the start timing for the zero-power off mode may be delayed by a predetermined time (e.g., 30 minutes) in view of user-friendliness.

Furthermore, with regard to an image copying job, an image reading job, and so on, which are commanded by operating the UI touchscreen 40 in the image processing apparatus 10, a delaying time may be set for each job, such as delaying each job by a time (e.g., 15 minutes) shorter than the delaying time (e.g., 30 minutes) for the start timing for the zero-power off mode.

In this case, with regard to a facsimile reception job, since it is assumed that no one would immediately view facsimile-received information to begin with, a facsimile reception job may be configured to include a setting for not performing a delay.

Accordingly, the start timing for the zero-power off mode is changed (mostly delayed) in accordance with the kind of job (service), whereby both energy conservation and user-friendliness may be meticulously achieved.

In step 280 in FIG. 8, a shutdown process is executed based on the preset shutdown program. Then, the operation proceeds to step 282 where a process for making a transition temporarily to the off mode is commanded. Subsequently, the operation proceeds to step 283 where a transition process to the zero-power off mode is commanded. The operation then proceeds to step 284. If a transition is made from step 228 in FIG. 6 to step 280 in FIG. 8, the transition process to the off mode in step 282 has already been commanded.

In step 284, it is determined whether or not the amount of charge in the power accumulating device 96 is sufficient.

If a positive determination result is obtained in step 284, that is, if it is determined that the amount of charge in the power accumulating device 96 is sufficient, the operation proceeds to step 286 where the power source is switched to the power accumulating device 96. Then, the operation proceeds to step 288 where the first power relay switch 118 is turned off. Subsequently, the operation proceeds to step 292.

If a negative determination result is obtained in step 284, that is, if the amount of charge in the power accumulating device 96 is insufficient, the operation proceeds to step 292 without making a transition to the zero-power off mode.

In step 292, it is determined whether or not the stop timing (e.g., 7 a.m.) for the zero-power off mode is reached. If a negative determination result is obtained, the operation proceeds to step 294 where it is determined whether or not the second power switch 44 is manually turned on. If a negative determination result is obtained in step 294, the operation returns to step 292. Until a positive determination result is obtained in step 292 or 294, steps 292 and 294 are repeated.

When a positive determination result is obtained in step 294, it is determined that the user desires to use the apparatus, and the operation proceeds to step 296. In step 296, it is determined whether the current mode is the off mode or the zero-power off mode. In the case of the zero-power off mode, the operation proceeds to step 298 where the first power relay switch 118 is turned on. Then, in step 299, the power source is switched to the LVPS 42A. The operation then proceeds to step 308. If the current mode is determined to be the off mode in step 296, the operation proceeds to step 308.

On the other hand, if a positive determination result is obtained in step 292, it is determined that the stop timing for the zero-power off mode is reached, and the operation proceeds to step 300.

In step 300, it is determined whether the current mode is the off mode or the zero-power off mode. In the case of the zero-power off mode, the operation proceeds to step 302 where the first power relay switch 118 is turned on. Then, in step 304, the power source is switched to the LVPS 42A. The operation then proceeds to step 306. In step 306, the second power switch 44 is turned on based on software. The operation then proceeds to step 308. If the current mode is determined to be the off mode in step 300, the operation proceeds to step 308.

In step 308, in accordance with whether the second power switch 44 is actually turned on or the stop timing for the zero-power off mode is reached, an activation process is executed based on the preset activation program. The operation then proceeds to step 204 in FIG. 5.

In step 204 in FIG. 5, as an alternative to performing a transition process to the service selection mode, for example, a process for restoring a preset mode may be performed. Furthermore, the mode just before the start timing for the zero-power off mode may be stored, and the stored mode may be restored when performing the restoring process.

In this exemplary embodiment, a transition to the zero-power off mode is made when the start timing for the zero-power off mode is reached and the amount of charge in the power accumulating device 96 is sufficient during the off mode. This zero-power off mode does not use electric power from the commercial power source 31 (i.e., the LVPS 42A) and exhibits a better power-saving effect than the off mode so long as the power accumulating device 96 is electrically charged by, for example, the solar panel 92.

In this case, the start timing for the zero-power off mode is set to 10 p.m. and the stop timing therefor is set to 7 a.m. in this exemplary embodiment. This is based on the apparatus usage conditions according to so-called general corporations. Since basic office hours in a so-called general corporation are from 9 a.m. to 5 p.m., it is assumed that the apparatus is not used from 10 p.m. to 7 a.m. in the following morning.

Therefore, the start timing and the stop timing for the zero-power off mode are not limited to 10 p.m. and 7 a.m. mentioned above and may be freely set by the user based on an apparatus non-usage period.

In FIG. 4, a dotted arrow b' indicates a modification when restoring from the off mode. Although a transition to the service selection mode is made, as indicated by an arrow b, in this exemplary embodiment (i.e., user-friendliness is given priority), the transition may alternatively be made to the sleep mode. In this case, energy conservation is given priority over user-friendliness.

Furthermore, in FIG. 4, the restoring destination from the zero-power off mode may be directly set to the service selection mode (i.e., user-friendliness is given priority over energy conservation). Furthermore, the restoring destination from the zero-power off mode may be directly set to the sleep mode (i.e., energy conservation is given priority over user-friendliness).

In this exemplary embodiment, the zero-power off mode is achieved (i.e., a state equivalent to when the first power relay switch 118 is turned off and the first power switch 41 is turned off) in a preset time frame regardless of the on and off states of the second power switch 44. Alternatively, the zero-power off mode may be achieved by executing off-control of the first power relay switch 118 when the second power switch 44 is manually operated, that is, when desired by the user.

For example, when the user (i.e., the last person leaving the area) leaves the area prior to the start timing of the zero-power off mode, even if the user turns off the second power switch 44 and leaves the area without waiting for the shutdown process based on the shutdown program to be completed, an energy conservation effect equivalent to that when the first power switch 41 is automatically turned off may be achieved when the start timing for the zero-power off mode is reached, whereby a sufficient effect may be exhibited.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply control device comprising:
    a commanding unit configured to command a transition between a first mode and a second mode, the first mode being a mode in which a process using a processor is executable, the second mode being a mode in which electric power from a first power source unit is limited and the process using the processor is not acceptable;
    a second power source unit that is provided independently of the first power source unit;
    a transition unit configured to switch a power supply source from the first power source unit to the second power source unit at a start timing within a preset time frame based on a condition in which a transition to the second mode is caused by the transition unit and that is configured to cause a transition to a third mode in which the process using the processor is not acceptable; and
    a restoring unit configured to switch the power supply source from the second power source unit to the first power source unit at a stop timing within the time frame and subsequently restores the second mode.

2. The power supply control device according to claim 1, wherein one of a standby mode and a sleep mode is selected as the first mode in accordance with a processing condition, the standby mode being a mode in which at least the process is executable immediately, the sleep mode being a mode in which the electric power from the first power source unit is supplied to the processor when a process execution command is received in a state where minimal electric power is supplied, and
    wherein the restoring unit is configured to restore the selected mode.

3. The power supply control device according to claim 1, further comprising:
    a first switch configured to be manually operated for turning on and off the supply of electric power from the first power source unit; and a control switch that is connected in series to the first switch and that is configured to be controlled by a controller for turning on and off the supply of electric power from the first power source unit, wherein the controller is configured to control for maintaining the first switch in an on state and switching the control switch to an off state during the third mode.

4. The power supply control device according to claim 1, wherein the commanding unit comprises an automatically-restorable second switch that is configured to command a transition from the first mode to the second mode and a transition from the second mode to the first mode.

5. The power supply control device according to claim 1, wherein the restoring unit is configured to be executed regardless of the time frame when the commanding unit is operated during the transition to the third mode.

6. The power supply control device according to claim 1, wherein the power supply control device is configured such that, when the transition unit causes the transition to the third mode, if a power supply duration time of the second power source unit is expected to fall short of the preset time frame, the transition to the third mode caused by the transition unit is prohibited.

7. The power supply control device according to claim 6, wherein the power supply control device is configured such that, in a zero-power sleep mode in which the second power source unit is used in the first mode, the supply of electric power from the second power source unit in the zero-power sleep mode is limited so that a shortage of the power supply duration time of the second power source unit relative to the preset time zone is suppressed.

8. The power supply control device according to claim 1, wherein the power supply control device is configured such that, if a process execution command is received during a specific time period prior to a transition timing at which the transition unit causes the transition to the third mode, the transition timing is repeatedly delayed.

9. The power supply control device according to claim 1, wherein the process is at least classified into a kind of a process based on a remotely-operated command and a kind of a process based on a directly-operated command, the kinds of processes having delaying times that are different from each other but including not delaying a transition timing at which the transition unit causes the transition to the third mode.

10. The power supply control device according to claim 1, wherein a power source of the second power source unit comprises a power accumulating device.

11. The power supply control device according to claim 10, wherein the power accumulating device is capable of accumulating electric power by solar electric generation.

\* \* \* \* \*